(12) United States Patent
Fehn et al.

(10) Patent No.: US 7,206,116 B2
(45) Date of Patent: Apr. 17, 2007

(54) FARADAY ROTATOR

(75) Inventors: Thomas Fehn, Planegg (DE); Sven Poggel, Planegg (DE); Stefan Balle, Planegg (DE)

(73) Assignee: Linos Photonics GmbH & Co. KG, Goettingen (DE)

( * ) Notice: Subject to any disclaimer, the term of this patent is extended or adjusted under 35 U.S.C. 154(b) by 24 days.

(21) Appl. No.: 10/524,512

(22) PCT Filed: Apr. 21, 2004

(86) PCT No.: PCT/EP2004/004232

§ 371 (c)(1),
(2), (4) Date: May 19, 2005

(87) PCT Pub. No.: WO2005/019914

PCT Pub. Date: Mar. 3, 2005

(65) Prior Publication Data

US 2005/0225831 A1  Oct. 13, 2005

(30) Foreign Application Priority Data

Jul. 23, 2003  (DE) ................. 103 33 570

(51) Int. Cl.
*G02F 1/09*  (2006.01)
*G02F 1/07*  (2006.01)
*G02B 27/28*  (2006.01)
*H01P 1/32*  (2006.01)

(52) U.S. Cl. .............. 359/280; 359/282; 359/283; 359/251; 359/255; 359/484; 333/1.1; 333/24.1; 333/24.3

(58) Field of Classification Search ........ 359/280–283, 359/251, 252, 255, 324, 483–485, 489, 579; 333/1.1, 14, 17.1, 24.1–24.3, 122, 218, 248, 333/256; 372/20, 26, 33, 37, 66, 94, 703; 324/244.1; 250/227.14
See application file for complete search history.

(56) References Cited

U.S. PATENT DOCUMENTS 2,644,930 A * 7/1953 Luhrs et al. ............. 333/1.1

(Continued)

*Primary Examiner*—Loha Ben
(74) *Attorney, Agent, or Firm*—Jordan and Hamburg LLP

(57) ABSTRACT

A Faraday rotator for a Faraday isolator with an input polarizer, with an output polarizer, with a roller-shaped optical crystal that is arranged therebetween and that is arranged symmetrical to its axis of symmetry, with a right hollow cylinder that surrounds this and has a hollow space made of a permanent magnetic material, which cylinder is axially magnetized and the magnetic field of which extends in the hollow space approximately parallel to the axis of symmetry that runs in only one direction from the north pole to the south pole, and with terminal magnets attached to each of the two end faces in the plane perpendicular to the y- and z-directions of the axis of symmetry, each of which is embodied as a hollow right cylinder and has a through-aperture in the extension of the axis of symmetry, is characterized in that each terminal magnet is largely radially magnetized with regard to the axis of symmetry at least by region, in that the one of the two terminal magnets is magnetized radially from interior to exterior and the other terminal magnet is magnetized radially from exterior to interior, and in that the hollow cylinder at its north pole is adjacent to the terminal magnet that is magnetized from interior to exterior and at its south pole is adjacent to the terminal magnet that is magnetized from exterior to interior.

5 Claims, 9 Drawing Sheets

U.S. PATENT DOCUMENTS

| | | | |
|---|---|---|---|
| 2,887,664 A | * | 5/1959 | Hogan ........................ 333/1.1 |
| 2,891,224 A | * | 6/1959 | Fox ........................... 333/24.3 |
| 3,023,379 A | * | 2/1962 | Turner ........................ 333/1.1 |
| 3,356,929 A | * | 12/1967 | Le Craw et al. ............ 333/218 |
| 3,418,036 A | * | 12/1968 | Holtzberg et al. .......... 359/283 |
| 3,666,351 A | * | 5/1972 | Pao ............................ 359/298 |
| 4,482,202 A | * | 11/1984 | Nagao ........................ 385/39 |
| 5,528,415 A | | 6/1996 | Gauthier et al. ............ 359/282 |

* cited by examiner

FARADAY ROTATOR

BACKGROUND OF THE INVENTION

The invention relates to a Faraday rotator for a Faraday isolator, namely such a Faraday isolator with an input polarizer, with an output polarizer, with a roller-shaped optical crystal that is arranged therebetween symmetrical to its axis of symmetry, with a right hollow cylinder that surrounds this and is made of a permanent magnetic material that is axially magnetized and the magnetic field of which extends in the hollow space approximately parallel to the axis of symmetry that runs in only one direction from the north pole to the south pole, and with terminal magnets, attached to each of the two end faces in the plane perpendicular to the y- and z-directions of the axis of symmetry, that are embodied as hollow vertical cylinders and have a through-aperture in the extension of the axis of symmetry.

Faraday isolators, also called optical isolators, have the object of permitting a laser beam to pass in only one direction. For this, it has an optical rotator, also called a Faraday rotator, polarizers being mounted on both the input and output thereof, and their direction of polarization to one another forms a 45° angle. In general the Faraday rotator comprises a roller-shaped crystal made of a magnetooptical material (for instance TGG). The crystal is surrounded by a hollow right cylinder made of a permanent magnetic material that generates a magnetic field that runs along the axis of symmetry of the crystal. The Faraday effect occurs in that the direction of polarization of the incoming laser beam is rotated by a certain angle when it passes through the crystal. The direction of rotation of the polarization direction is independent of the propagation direction of the laser beam. The size of the angle of rotation is a function of one of the characteristic constants for the material of the optical crystal. This itself is a function of the wavelength of the laser beam. The angle of rotation of the direction of polarization during operation is adjusted such that it is approximately 45°. The output polarizer is also arranged rotated about this angle, and in addition transmits the maximum radiation intensity. A beam that runs against the propagation direction passes the output polarizer and is rotated 45° (in the same direction), that is, a total of 90°, by the Faraday rotator, so that high quenching, also called extinction, is effected for the returning laser beam. In order to increase this further to a higher extinction, so-called two- or even multi-stage Faraday isolators are used in which the extinction is further enhanced.

Such a generic Faraday isolator is known in and of itself. The roller-shaped magnetooptical crystal is surrounded by a right hollow cylinder with a circular cross-section and made of permanent magnetic material that is polarized magnetically in the axial direction. One terminal magnet, in the form of a right hollow cylinder with a circular cross-section, can be connected on either side to the two end surfaces of this hollow cylinder, which are both magnetized parallel to the axis of symmetry of the magnetooptical crystal, that is, also in the axial direction, like the hollow cylinder surrounding the crystal. In addition, the two terminal magnets are magnetized axially in the same direction to one another and with reference to the hollow cylinder opposite the hollow cylinder as central magnet.

Such a generally known Faraday isolator has proved itself. However, a more compact structure is not possible in order to attain the necessary magnetic field strengths in the magnetooptical crystal.

The object of the invention is therefore to embody more compactly a generic Faraday isolator with good homogeneity of the magnetic field strengths.

SUMMARY OF THE INVENTION

This object is inventively attained in a generic Faraday isolator in that each terminal magnet is largely radially magnetized with regard to the axis of symmetry at least by region, in that the one of the two terminal magnets is magnetized radially from interior to exterior and the other terminal magnet is magnetized radially from exterior to interior, and in that the hollow cylinder at its north pole is adjacent to the terminal magnet that is magnetized from interior to exterior and at its south pole is adjacent to the terminal magnet that is magnetized from exterior to interior.

Thus, in the inventive principle the center cylinder magnetized parallel to the axis of symmetry in the axial direction is essential. Its magnetic field strengths are amplified in the hollow space of the cylinder (that is, in the region of the crystal) by the two terminal magnets in the region of the contact location to the—center—cylinder such that a higher magnetic field strength results across the axial length of the crystal.

This inventive principle has the advantage that substantially smaller structures can be provided for the Faraday rotator, both in the axial and in the radial direction, so that a compact structure results overall for the Faraday isolator in accordance with the invention. In order to increase this further to a maximum extinction at which the still-present last transmission can be suppressed below negligible values, the invention can also be used in two- or multi-stage Faraday isolators.

The two terminal magnets can either be fitted as one-piece right hollow cylinders with a circular cross-section and with a magnetic field ideally directed radially with regard to the axis of symmetry, or can comprise individual parts that are largely sector-shape in cross-section, like wedges of pie, in which a uniform orientation of the magnetic field in one direction, parallel to the plane of symmetry (which passes through the axis of symmetry of the crystal) of the pie wedge-shape part. Such a design would be attained if the pie wedge-shape part is cut out of a rectangular permanent magnet with uniform magnetic field.

Using approximately radially magnetized magnets with Faraday isolators is known (U.S. Pat. No. 5,528,415). Apart from the fact that these magnets comprise four radiation-symmetrical parts that have a trapezoidal cross-section, while leaving free an aperture that is square in cross-section, that is, in contrast to the invention, that do not symmetrically include the roller-shape crystal, there is no center cylinder of the permanent magnets in this known embodiment, which however is essential for the invention due to the overlaying effect at the contact location. In addition, the two radially magnetizable magnets are arranged spaced from one another in the axial direction so that consequently only a weak overlaying effect can occur in the vicinity of the two magnets. In one useful embodiment, the terminal magnets that are at least largely radially magnetized by region are magnetized such that they also possess a component in the direction of the axis of symmetry of the crystal. Because of this, there is a further enhancement of the strength of the magnetic field in the hollow region of the cylinder compared to the generic prior art.

Additional useful embodiments and further developments of the invention are characterized in the subordinate claims.

One preferred exemplary embodiment of the invention is explained in more detail in the following with reference to the drawings.

DETAILED DESCRIPTION OF THE INVENTION

Figure 1A:
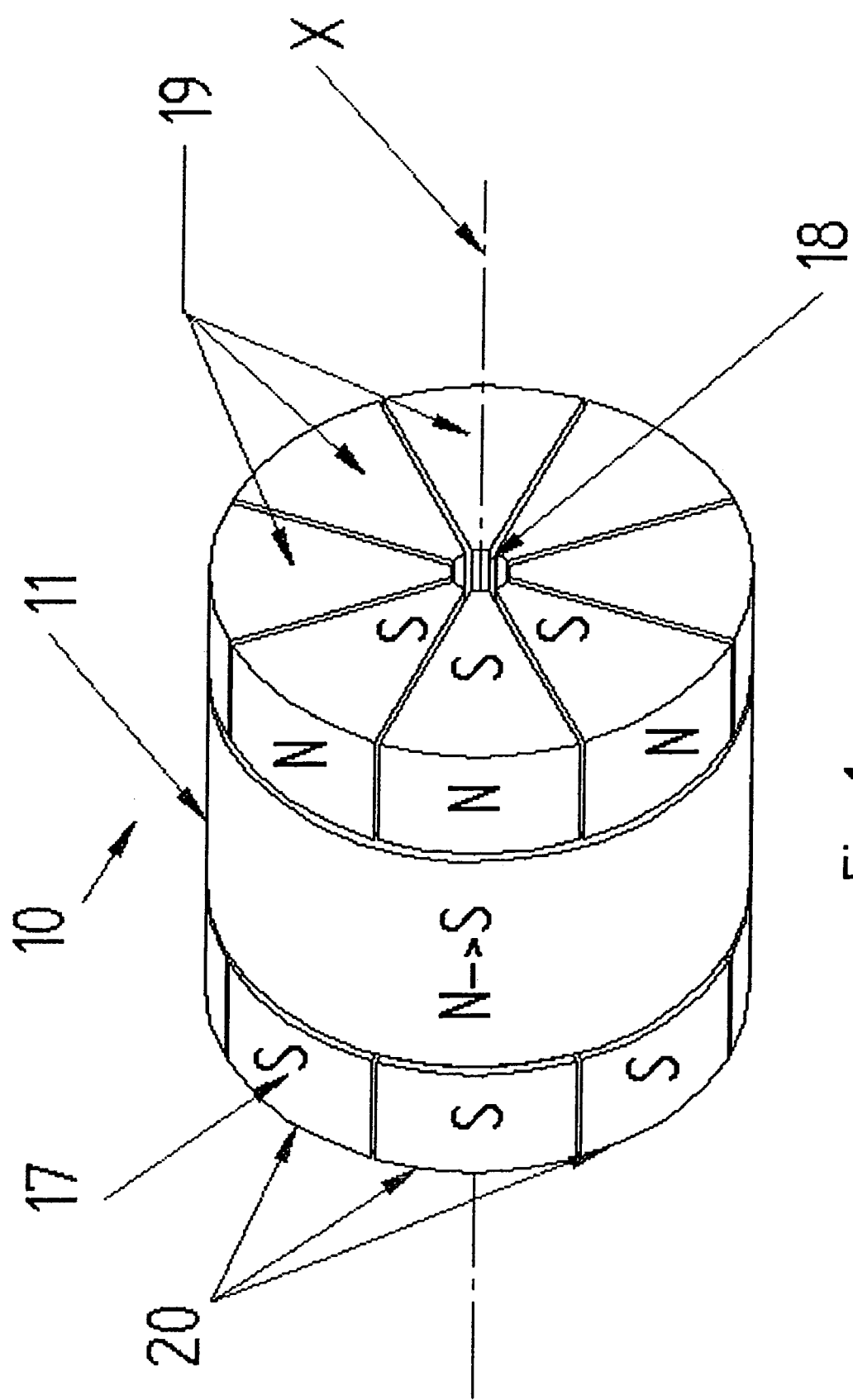
FIG. 1 is a perspective drawing of the Faraday rotator in accordance with the invention.
Figure 1B:
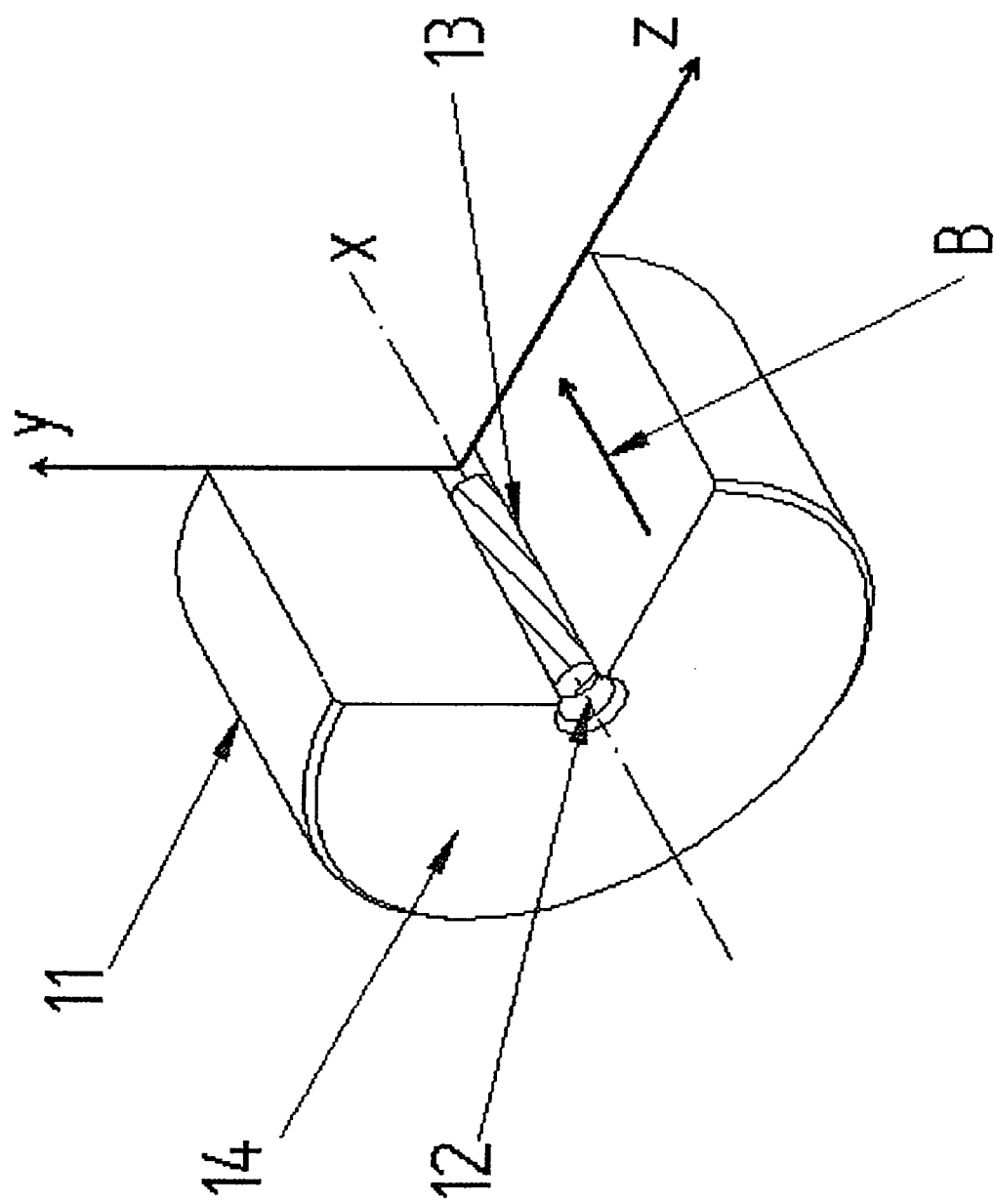

The Faraday isolator in FIG. 1, labeled 10 as a whole, is constructed symmetrically with respect to its axis of symmetry (x). It has a right—center—cylinder 11 that has a circular cross-section (FIG. 1a), in the cylindrical hollow space 12 of which is arranged the magnetooptical crystal, labeled 13 as a whole (FIG. 1b). The crystal can extend in the axial direction across the entire axial length of the cylinder 11 to the two end faces 14, which are in the two planes that extend perpendicular to the axis of symmetry x through the y and z axes. The cylinder 11 comprises a permanent magnetic material and is embodied with its magnetic field B parallel to the axis of symmetry x (FIG. 1b).

Figure 2:
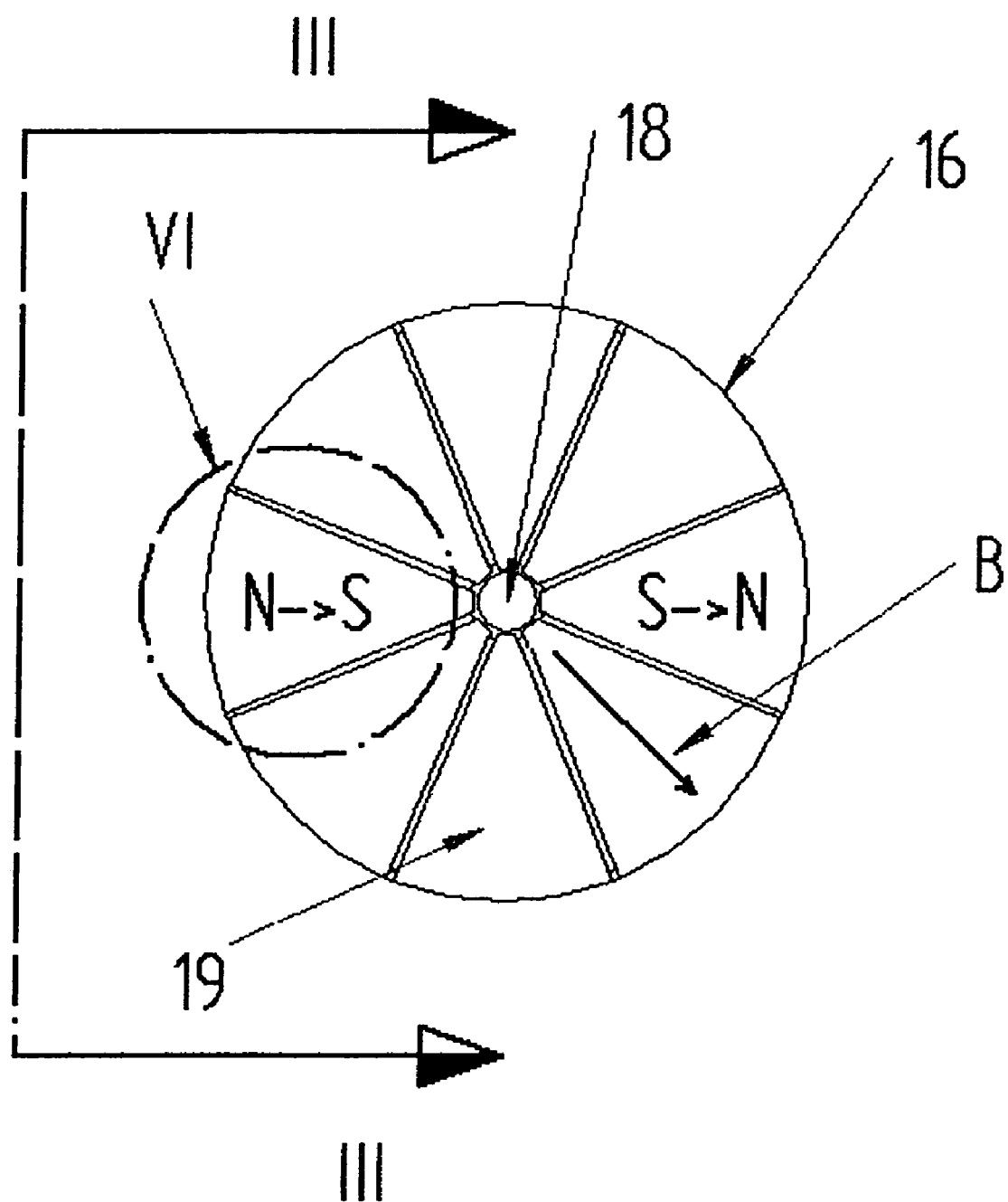
FIG. 2 is a schematic head-on view of the Faraday rotator in accordance with FIG. 1.

As can be seen in FIG. 1a, attached to the two end faces 14 are the two terminal magnets 16 and 17, which are both formed like the cylinder 11 as hollow, vertical cylinders that have a circular cross-section and have a through-aperture 18 extending the axis of symmetry x (see also FIG. 2).

Figure 4:
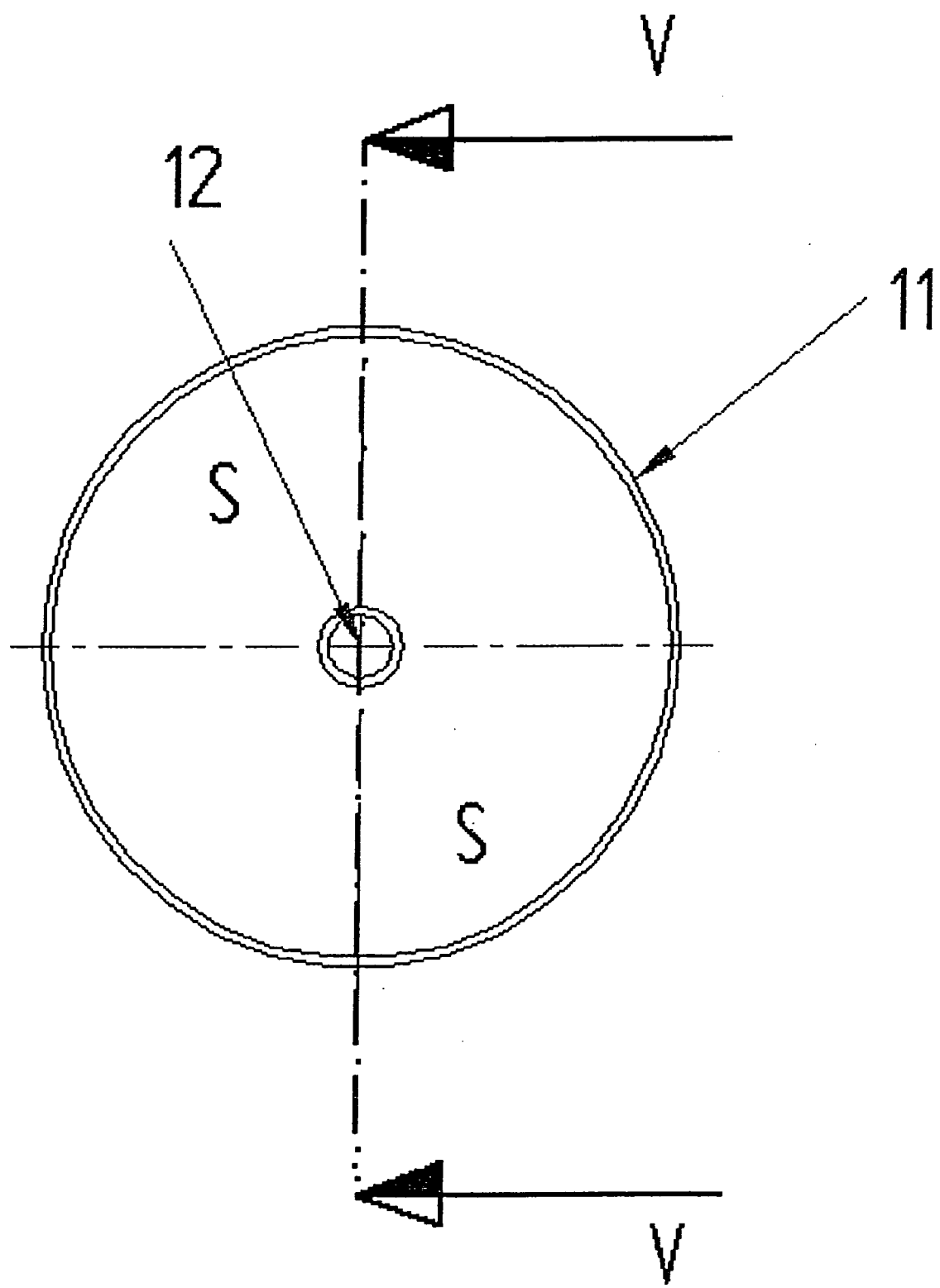
FIG. 4 is a section IV—IV in accordance with FIG. 3.
Figure 5:
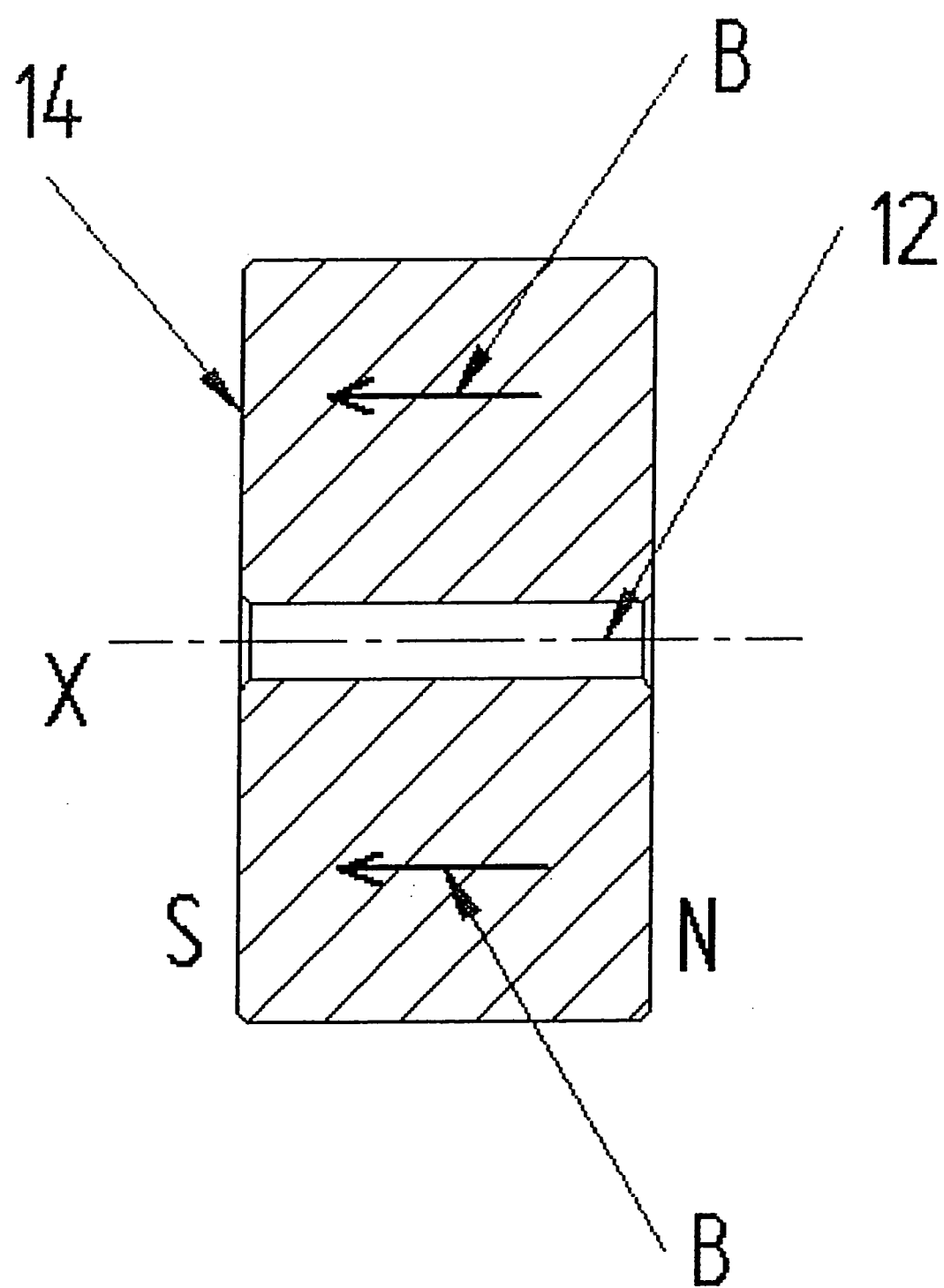
FIG. 5 is a section V—V in accordance with FIG. 4.

The hollow cylinder 11 as a permanent magnet is illustrated in greater detail in FIGS. 4 and 5. Clearly visible is the magnetic field strength B, which is oriented parallel to the axis of symmetry x and the north pole N of which is located on the one end face 14 and the south pole S of which is located on the opposing end face.

In the exemplary embodiment illustrated, neither of the two terminal magnets 16, 17 is embodied in one piece and precisely radially magnetized, but rather each comprises eight pie wedge-shape parts 19 and 20 that with respect to the axis of symmetry x are largely radially magnetized, and radiation-symmetrical. One such part 19 (FIG. 2) is illustrated in greater detail and in a larger scale in FIG. 6. The axis of symmetry x here is perpendicular to the drawing plane, which in the section illustrates the part that is in the y/z plane and that up to the through-aperture 18 is largely in the shape of a sector.

Figure 7A:
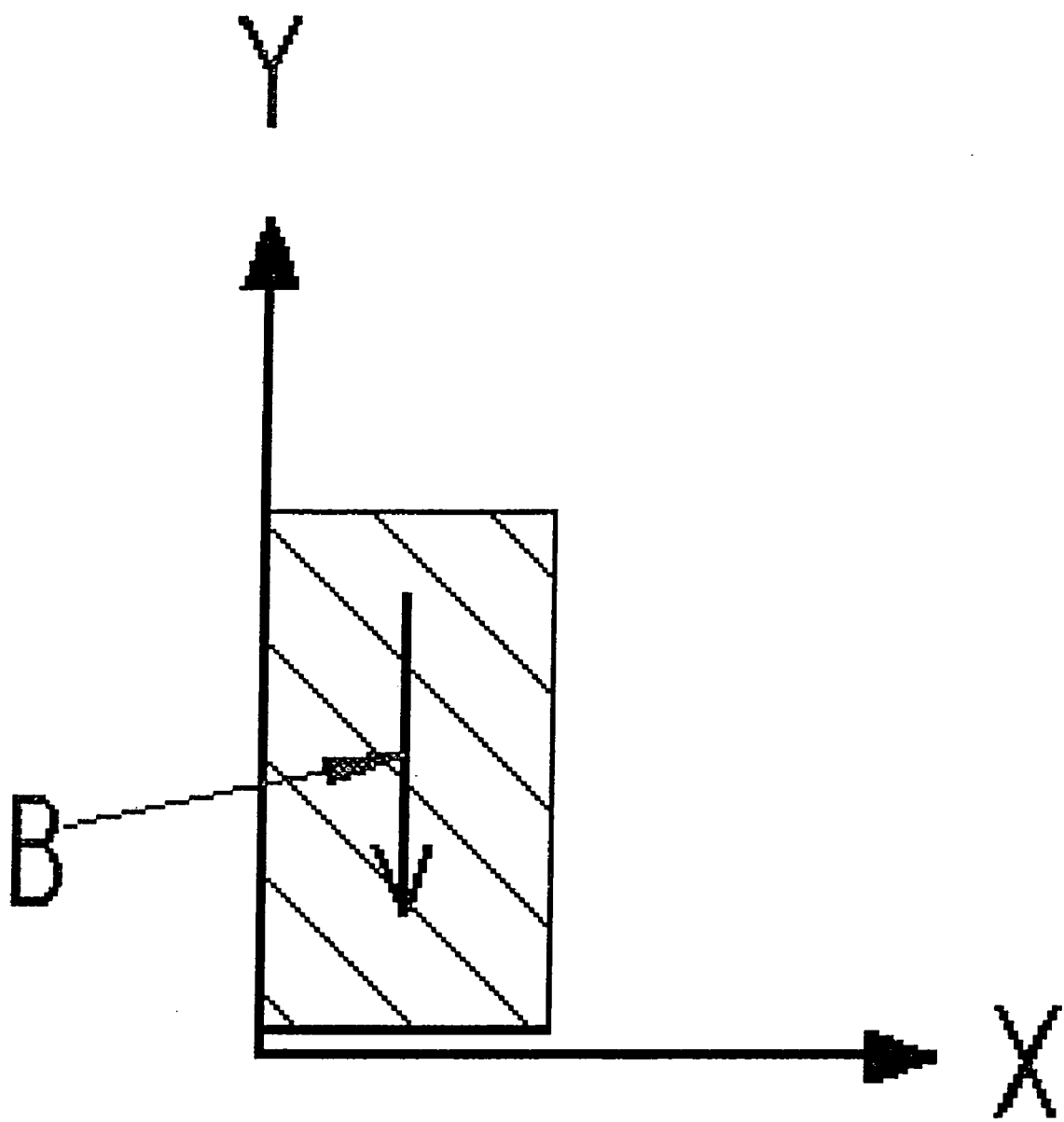
FIG. 7a is the section VII—VII in accordance with FIG. 6, as a first embodiment; and, FIG. 7b is the section VII—VII in accordance with FIG. 6, in a second embodiment.
Figure 7B:
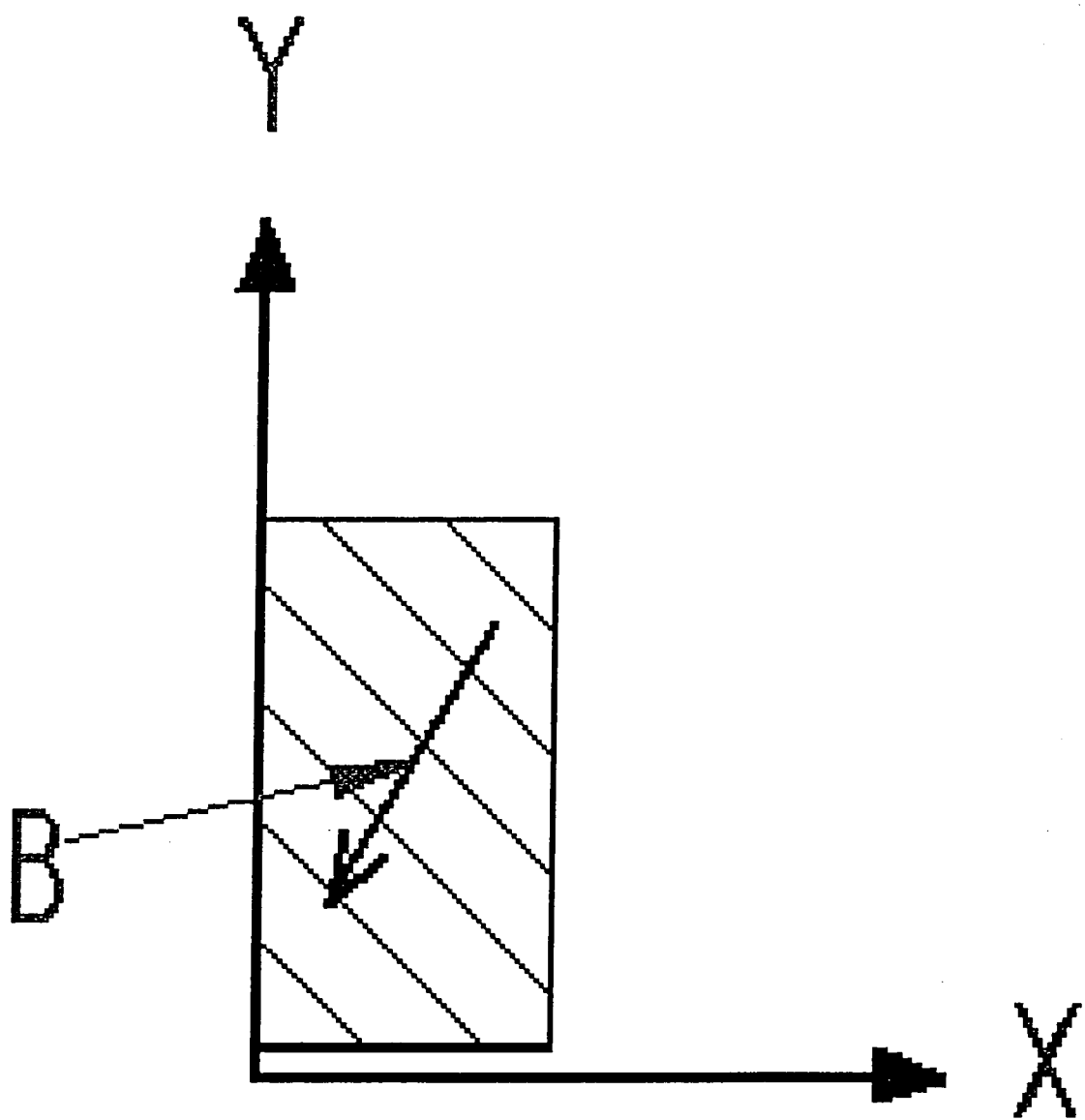

Two different embodiments are illustrated in the section VII—VII in associated FIGS. 7a and 7b. In the embodiment in accordance with FIG. 7a, the magnetic field is oriented without a component in the direction of the axis of symmetry x, that is, only in the y/z plane. This embodiment possesses a stronger magnetic field in the region of the crystal 13 compared to the generic prior art.

If, in addition, the entire magnetic field B and the axis of symmetry x form an angle other than 90°, even better results occur than in the embodiment in accordance with FIG. 7b, (which results however are attained using increased production complexity). Within one part 19 or 20, the orientation of the magnetic field B is parallel and, oriented in the sectional plane VII—VII in accordance with FIG. 6, that forms the mirror symmetry plane for the part 19 of the terminal magnet 16 illustrated in FIG. 6.

The arrangement and polarization of the terminal magnets to the axially magnetized cylinder 11 is essential.

Figure 6:
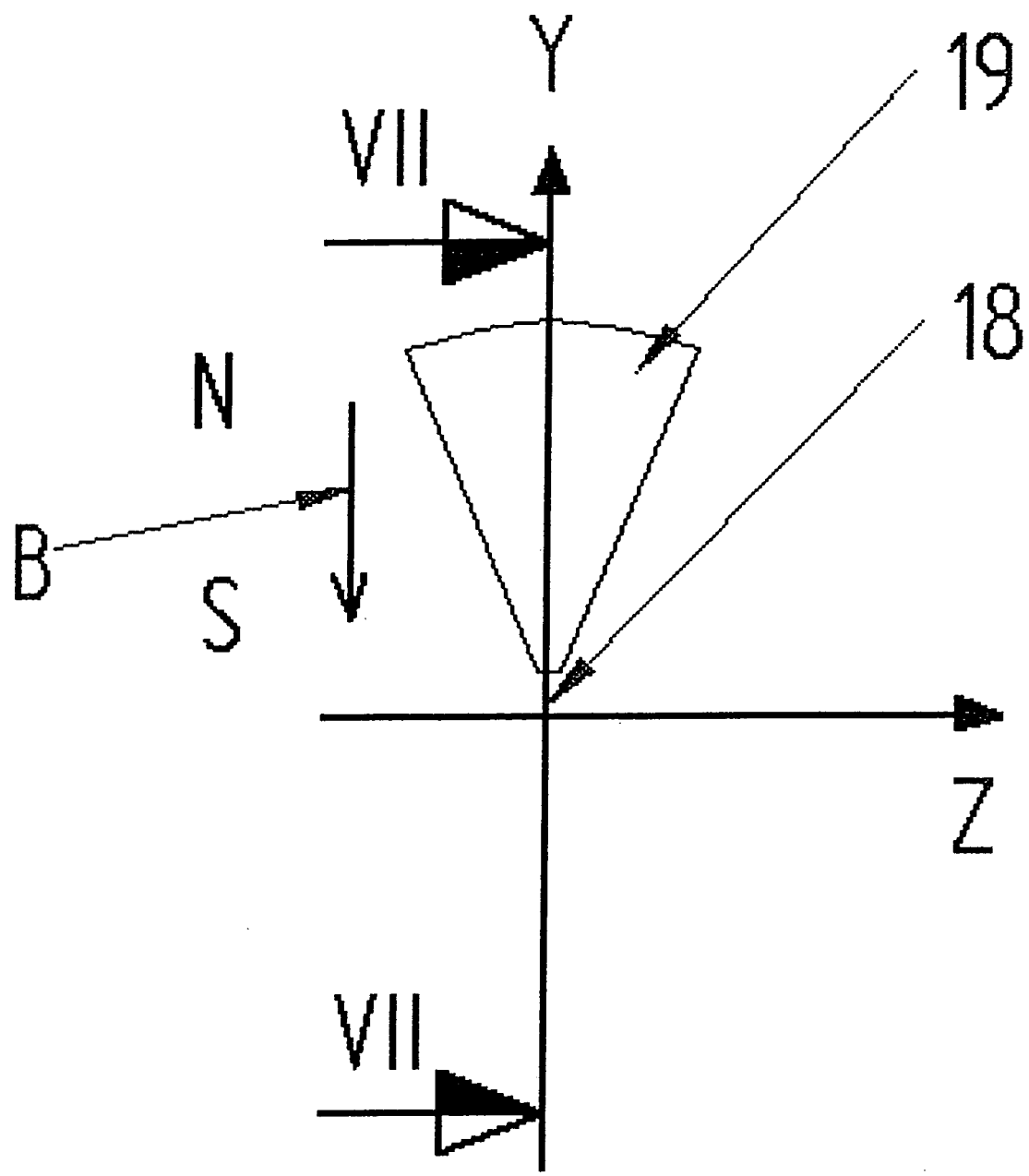
FIG. 6 is the detail VI in accordance with FIG. 2.

As is illustrated in FIGS. 6 and 7, each part 19 and 20 of the terminal magnets 16 or 17 is magnetized somewhat radially. In addition, the one terminal magnet 17 is then magnetized from interior to exterior (that is, with the south pole S in the outer-most partial cover region), while the other terminal magnet 16 is polarized from exterior to interior, that is, with the north pole in the exterior partial cover region, as depicted schematically in FIGS. 2 and 3.

Figure 3:
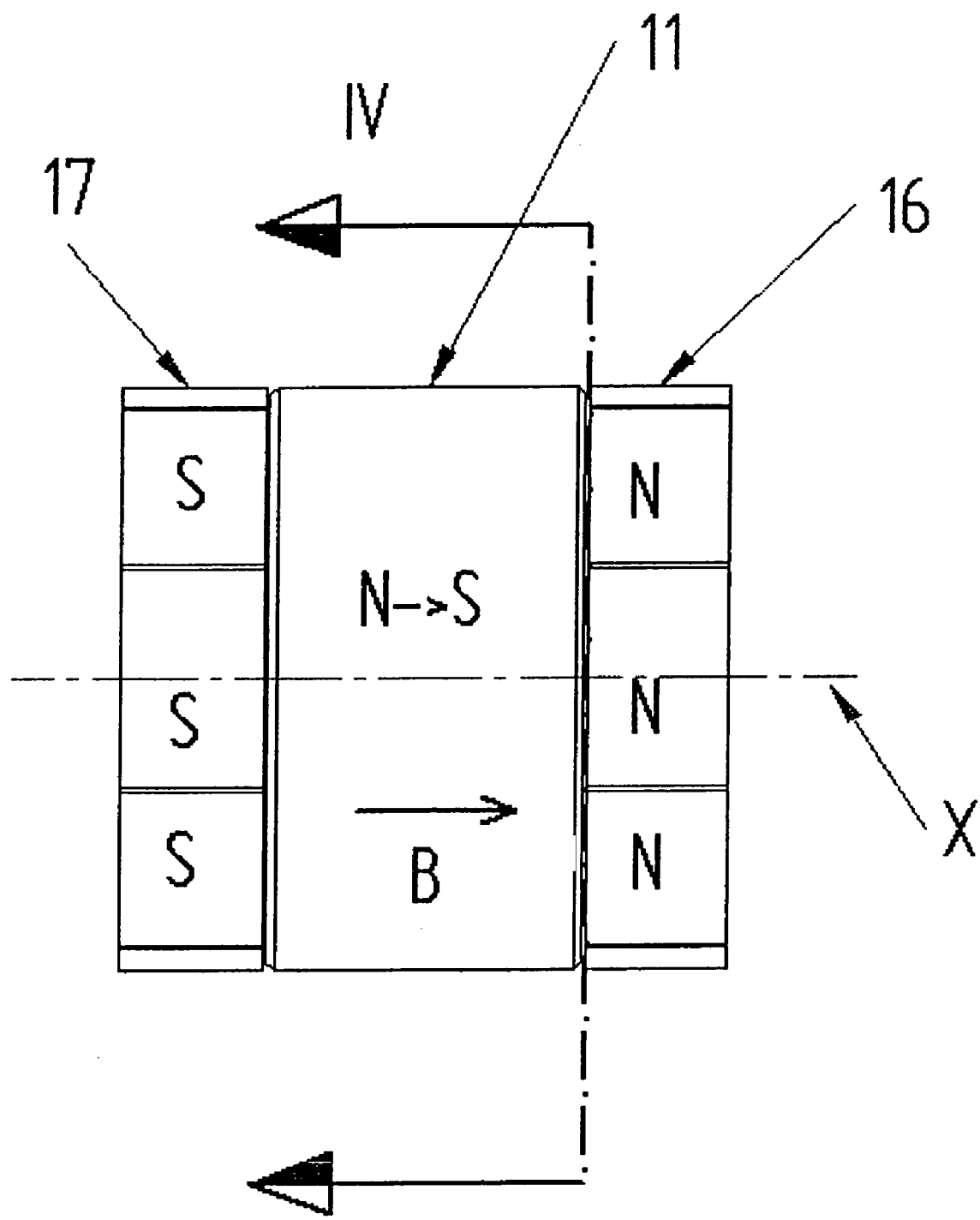
FIG. 3 is a view III—III in accordance with FIG. 2.

Finally, in accordance with the teaching of the invention, the hollow cylinder 11 must at its north pole N be adjacent to the terminal magnet 17 magnetized from interior to exterior and at its south pole S to the terminal magnet 16 magnetized from exterior to interior, as illustrated in FIGS. 2 and 3. This is the only manner in which the inventive results are attained.

The invention claimed is:

1. A Faraday rotator for a Faraday isolator, the Faraday rotator comprising a roller-shaped magnetooptical crystal having an axis of symmetry, a right circular hollow cylinder comprised of a permanent magnetic material surrounding the crystal, the cylinder being axially magnetized whereby a magnetic field thereof approximately parallel to the axis of symmetry extends into the hollow of the cylinder, the magnetic field running in only one direction from a north pole to a south pole, and respective right cylindrical permanent magnets attached to respective end faces of the hollow cylinder-surrounded crystal, each of said end face magnets having an aperture therethrough which is coaxial with the axis of symmetry, wherein at least a region of one of the end face magnets at the north-magnetized end of the axially magnetized cylinder is radially magnetized from interior to exterior whereby a magnetic field of said one end face magnet has its north pole radially inward and its south pole radially outward and at least a region of the other end face magnet at the south-magnetized end of the axially magnetized cylinder is radially magnetized from exterior to interior whereby a magnetic field of said other end face magnet has its south pole radially inward and its north pole radially outward.

2. A Faraday rotator according to claim 1, wherein said regions are substantially sectors.

3. A Faraday rotator according to claim 1, wherein said regions are in the form of respective discrete parts which, when assembled with other parts, form the respective end face magnets.

4. A Faraday rotator according to claim 3, wherein the discrete parts are each substantially in the shape of a respective sector.

5. A Faraday rotator according to claim 1, wherein the respective magnetic fields of the end face magnets are oriented obliquely with respect to the axis of symmetry.

* * * * *